(12) United States Patent
Hurdle, Jr.

(10) Patent No.: US 6,772,665 B1
(45) Date of Patent: Aug. 10, 2004

(54) BAND SAW WITH RECIPROCATING WORKPIECE AND METHOD OF USING

(76) Inventor: Ennis J. Hurdle, Jr., 16195 Highway 57, Moscow, TN (US) 38057-6869

( * ) Notice: Subject to any disclaimer, the term of this patent is extended or adjusted under 35 U.S.C. 154(b) by 60 days.

(21) Appl. No.: 10/138,731

(22) Filed: May 3, 2002

(51) Int. Cl.$^7$ ................................................. B27B 3/00
(52) U.S. Cl. ............................. 83/109; 83/162; 83/368; 83/707; 83/813; 144/378; 144/356
(58) Field of Search ................................ 144/378, 356, 144/357, 367, 369; 83/813, 809, 365, 368, 788, 794, 155.1, 166, 797, 731, 359, 703, 707, 109, 150, 147, 801, 163, 162

(56) References Cited

U.S. PATENT DOCUMENTS

| | | | |
|---|---|---|---|
| 524,135 A | | 8/1894 | Edgar |
| 1,334,096 A | | 6/1920 | Sprague |
| 1,487,649 A | | 3/1924 | Foreman |
| 2,670,771 A | * | 3/1954 | Lockwood et al. ......... 144/178 |
| 2,739,626 A | * | 3/1956 | Southworth et al. ....... 83/435.2 |
| 3,850,061 A | | 11/1974 | Wirstrom ........................ 83/4 |
| 4,030,386 A | | 6/1977 | Poetzsch et al. ................. 83/4 |
| 4,205,568 A | * | 6/1980 | Foster ......................... 144/378 |
| 4,253,361 A | | 3/1981 | Pryor et al. ..................... 83/90 |
| 4,289,180 A | | 9/1981 | Weinzierl .................... 144/312 |
| 4,291,601 A | * | 9/1981 | Guynup ......................... 144/13 |
| 4,353,276 A | * | 10/1982 | Ackerfeldt ................... 144/378 |
| 4,732,184 A | | 3/1988 | Albright ...................... 144/361 |
| 4,926,917 A | | 5/1990 | Kirbach ....................... 144/356 |
| 5,035,166 A | * | 7/1991 | Carlson et al. ................ 83/813 |
| 5,088,363 A | | 2/1992 | Jones et al. ..................... 83/35 |
| 5,722,474 A | | 3/1998 | Raybon et al. ............. 144/357 |
| 5,819,613 A | * | 10/1998 | Wilson et al. ................. 83/13 |
| 2003/0145906 A1 | * | 8/2003 | Tekulve et al. ............. 144/378 |

FOREIGN PATENT DOCUMENTS

WO        WO-93/09923        * 5/1993

OTHER PUBLICATIONS

Fastline Saw Systems, Inc. Advertisement for Fastline Gator 204 Resaw with Run–Around System (date unknown).

* cited by examiner

*Primary Examiner*—Stephen Choi
(74) *Attorney, Agent, or Firm*—Walker, McKenzie & Walker, PC

(57) ABSTRACT

A resaw apparatus and method of sawing a succession of boards from a cant of a succession of cants. A band saw is vertically positioned to cut the succession of boards from the cant as the cant is reciprocated through the saw. A pivoted raker gate downstream of the band saw's blade engages the cut board and prevents it from passing through the saw in the reverse direction. A vertically movable live hold-down roller upstream of the saw blade presses down on the cant during sawing. A measuring device measures the cant's height prior to sawing the first board from the cant. When the raker gate moves into its vertical position after the cut board passes, the saw blade is raised slightly to avoid contact with cant splinters on the reverse pass. Each cant is processed to completion before sawing the next cant.

7 Claims, 4 Drawing Sheets

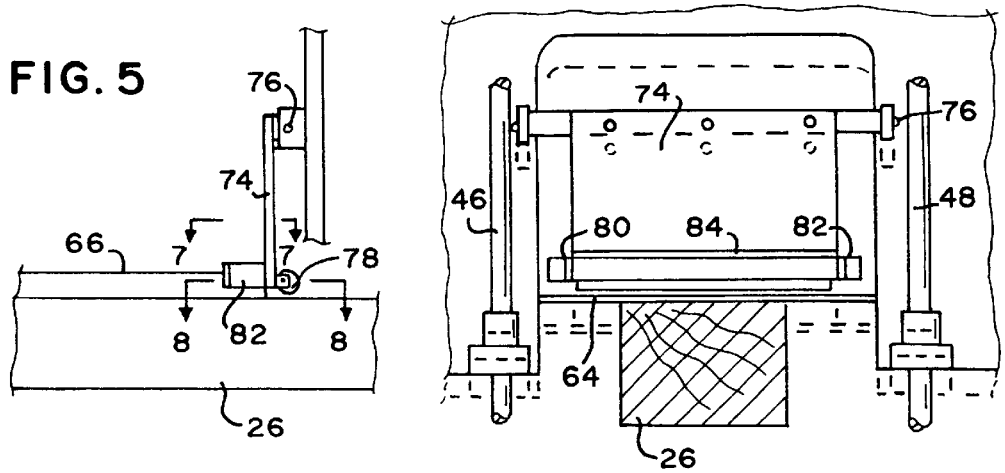
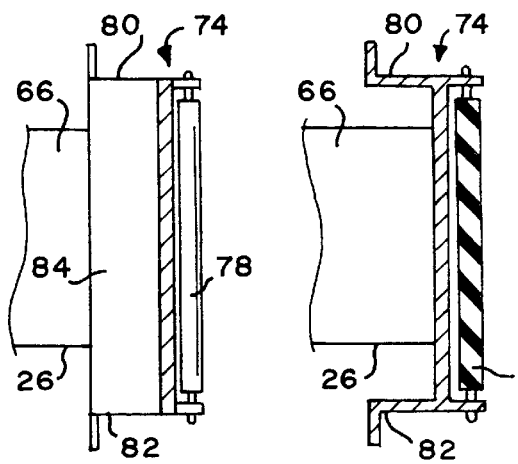
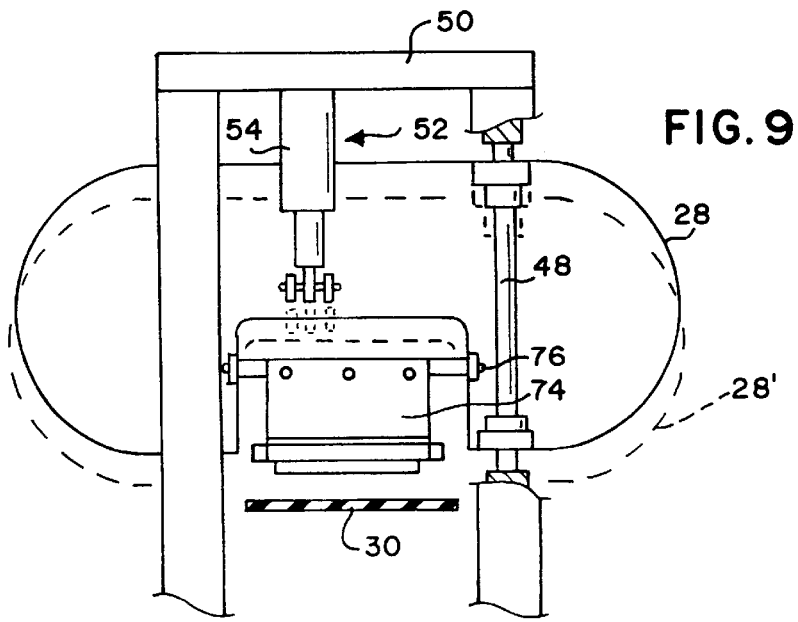

BAND SAW WITH RECIPROCATING WORKPIECE AND METHOD OF USING

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to sawmills in the lumber industry, and in particular, to resaw apparatus used in sawmills to cut boards off of log cants.

2. Information Disclosure Statement

Sawmills often employ so-called "resaw" apparatus to saw boards from a succession of log cants, which are logs that have been cut into substantially rectangular or square shape. Well-known solutions for such resaw apparatus include band saws that saw boards from the bottom of the cants, and such resaw apparatus are known to cause a succession of cants to circulate past the band saw in successive passes in a forward direction only on a conveyor belt or rollers, such that the cants pass through the band saw and then are moved onto recirculation belts or rollers and then recirculated around the band saw and back to the infeed of the saw for the next pass through the saw. Such an approach, known as a "run-around" cant feed system, has the disadvantage that only a single board is cut off each of the succession of cants as they pass through the band saw, causing the sawmill operator to lose familiarity with a given cant as other cants are processed before the next pass of the given cant through the band saw, thereby causing less optimal cutting decisions to be made for each cant than would otherwise be possible if a given cant were processed to completion before moving to the next cant. Additionally, because the boards in most prior art resaw systems are sawed from the bottom of the cant, the sawmill operator is prevented from viewing the grade of the wood that is about to be cut into a board, thereby preventing optimal decisions by the sawmill operator as to when the cant should be turned to another face in order to maximize the grade of wood being cut from the cant. Additionally, such a "run-around" system occupies excessive space in a sawmill because of the recirculation of the cants back to the infeed of the saw after each cut.

It is therefore desirable to have an improved resaw apparatus that allows the sawmill operator to process each cant to completion before beginning the resaw process on the next cant, that permits the sawmill operator to view the grade of wood about to be cut from each cant, and that occupies less floor space than prior-art "run-around" cant feed systems.

A preliminary patentability search in Class 83, Subclasses 794, 788, 813, 703, 155.1, 707, 166, 871, 820, and 731, and Class 144, Subclass 378, produced the following patents, some of which may be relevant to the present invention: Edgar, U.S. Pat. No. 524,135 (issued Aug. 7, 1894); Sprague, U.S. Pat. No. 1,344,096 (issued Jun. 22, 1920); Foreman, U.S. Pat. No. 1,487,649 (issued Mar. 18, 1924); Wirstrom, U.S. Pat. No. 3,850,061 (issued Nov. 26, 1974); Poetzsch et al., U.S. Pat. No. 4,030,386 (issued Jun. 21, 1977); Pryor et al., U.S. Pat. No. 4,253,361 (issued Mar. 3, 1981); Weinzierl, U.S. Pat. No. 4,289,180 (issued Sep. 15, 1981); Albright, U.S. Pat. No. 4,732,184 (issued Mar. 22, 1988); Kirbach, U.S. Pat. No. 4,926,917 (issued May 22, 1990); Jones et al., U.S. Pat. No. 5,088,363 (issued Feb. 18, 1992); and Raybon et al., U.S. Pat. No. 5,722,474 (issued Mar. 3, 1998).

Edgar, U.S. Pat. No. 524,135, discloses a sawmill in which a cant reciprocates back and forth upon a carriage past a fixed band saw having a vertical cutting blade.

Sprague, U.S. Pat. No. 1,344,096, discloses a band saw having a horizontal cutting blade, and a cant passes past the cutting blade so that a board is cut from the bottom of the cant.

Foreman, U.S. Pat. No. 1,487,649, discloses a band saw in which cants pass without reciprocation past the saw blade. A board is cut from the bottom of the cant, and the cants "loop around" and make successive passes past the saw blade.

Wirstrom, U.S. Pat. No. 3,850,061, discloses a band saw that makes horizontal cuts through a horizontally-reciprocating piece of plastic. Cuts are made in both directions of reciprocation, and the saw moves vertically to make successive cuts.

Poetzsch et al., U.S. Pat. No. 4,030,386, discloses a band saw that makes horizontal cuts through a horizontally-reciprocating piece of plastic. Cuts are made in both directions of reciprocation, and the saw moves vertically to make successive cuts.

Pryor et al., U.S. Pat. No. 4,253,361, discloses a sawmill in which cants move past a circular vertical saw blade, with various mechanisms being shown for flipping and turning the cants.

Weinzierl, U.S. Pat. No. 4,289,180, discloses a band saw having a horizontal cutting blade that cuts boards from the top of stationery cants. The band saw moves vertically to accomplish successive cuts.

Albright, U.S. Pat. No. 4,732,184, discloses a lumber saw-sizing machine in which four band saws operate on a piece of lumber as the lumber is fed through the machine without reciprocation. A hold-down roller holds the log in place during sawing.

Kirbach, U.S. Pat. No. 4,926,917, discloses use of optical measuring devices in the context of a sawmill.

Jones et al., U.S. Pat. No. 5,088,363, discloses a sawmill having multiple close-spaced horizontal band saws in which the cant is not reciprocated past the band saws.

Raybon et al., U.S. Pat. No. 5,722,474, discloses a sawmill having a computerized scanning station that scans dimensions of logs.

Additionally, Fast Line Saw Systems, Inc., of Central City, Ky., is known to advertise a band saw in combination with a re-saw system under the trademark Fast Line Gator 204 Resaw with Run-around System, typical of other so-called "run-around" resaw equipment that do not have a reciprocating workpiece but instead has the cant make multiple forward passes only through the band saw by passage on a conveyor system that circulates the cant around the band saw in a well-known "run-around" cant feed configuration.

None of these references, either singly or in combination, disclose or suggest the present invention.

BRIEF SUMMARY OF THE INVENTION

The present invention is an improved resaw apparatus for sawing boards from log cants, in which the cant is reciprocated past a band saw that removes boards from the top of the cant as the cant moves in a first direction past the band saw. A raker gate catches each newly-sawn board from the top of the cant as the cant reciprocates in the reverse direction in preparation for the next pass through the band saw.

It is an object of the present invention to provide an improved resaw apparatus that removes boards from the top of log cants and that processes each cant to completion before sawing of the next cant is begun. It is a further object of the present invention to provide a resaw apparatus that is more compact than prior art resaw apparatus and that uses less floor space in a sawmill than prior art "run-around" cant feed configuration resaw apparatus.

BRIEF DESCRIPTION OF THE SEVERAL VIEWS OF THE DRAWING

FIG. 5 is a side elevational view of the raker gate of the present invention, taken substantially along the line 5—5 shown in FIG. 4.

FIG. 6 is a rear elevational view of the raker gate of the present invention and showing the vertical movement of the band saw.

FIG. 7 is a sectional top plan view of the raker gate of the present invention, taken substantially along the line 7—7 shown in FIG. 5.

FIG. 8 is a sectional top plan view of the raker gate of the present invention, taken substantially along the line 8—8 shown in FIG. 5.

FIG. 9 is a rear elevational view of the raker gate of the present invention, taken substantially along the line 9—9 shown in FIG. 1, showing vertical movement of the band saw, and with part of the band saw mounting frame removed to show hidden detail.

DETAILED DESCRIPTION OF THE INVENTION

Figure 1:
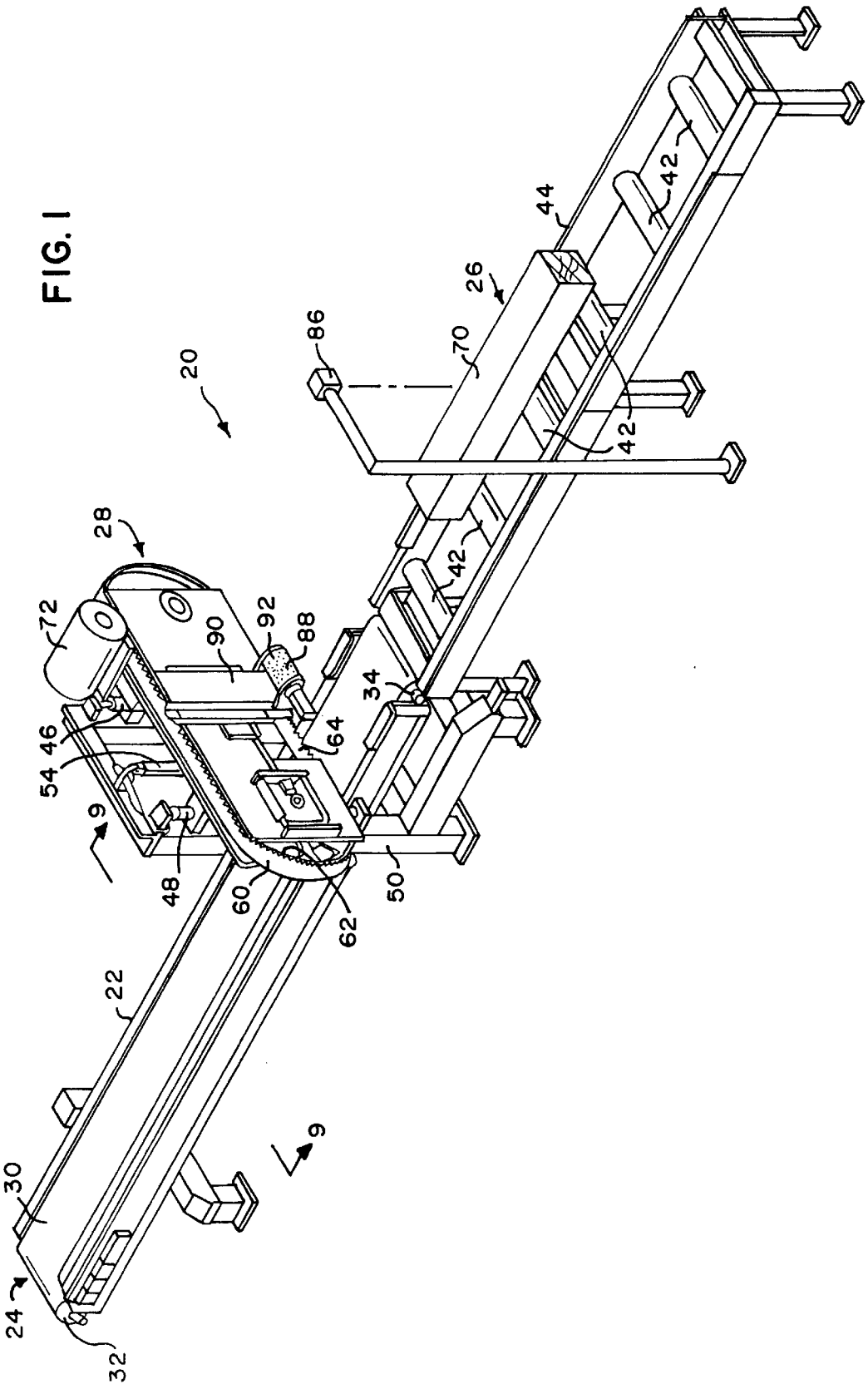
FIG. 1 is a perspective view of the present invention showing a cant on the infeed rollers.

Referring to FIGS. 1–10, the resaw apparatus 20 of the present invention is seen to include an outfeed table 22 having a conveyor means 24 for reciprocatingly transporting a cant 26 of a succession of cants past a band saw 28, as hereinafter described A "cant," as that term is used herein and as it is also used in the lumber industry, is an elongated piece of wood having a substantially square or rectangular cross-section, ranging from about 2.0 to 18.0 inches (5.1 to 45.7 cm.) in height or width. Conveyor means 24 includes a well-known conveyor belt 30 mounted upon well-known rollers 32, 34, and driven in both forward and reverse directions by a reversible hydraulic motor 36 controlled by a sawmill operator through a hydraulic valve 38 that is operably connected to a lever 40 that causes hydraulic fluid to flow from a pressurized hydraulic fluid source to and from motor 36, in a manner well-known to those skilled in the art Conveyor means 24 also preferably includes a plurality of well-known hydraulically-powered rollers 42 on an infeed table 44, upstream of band saw 28, that operate in tandem with conveyor belt 30 as controlled by lever 40 and valve 38 to move cant 26 in forward and reverse directions with respect to band saw 28, in a manner that will now be understood, as lever 40 is moved between forward and reverse positions by the sawmill operator. It shall be understood that lever 40 operates valve 38 not only to control the forward and reverse direction of movement of conveyor means 24, but also the forward and reverse speed with which conveyor means 24 moves the cant 26. Without departing from the present invention, conveyor belt 30 of conveyor means 24 for outfeed table 22 may instead and equivalently be replaced by well-known hydraulically-powered rollers like the rollers 42 of infeed table 44, and the speed and direction of such equivalent hydraulically-powered rollers on the outfeed table 22 would be controlled in a manner similar to the control of conveyor belt 30 and/or of rollers 42 of infeed table 44, as will now be understood by those skilled in the art.

Band saw 28 is mounted substantially transverse to the forward and reverse directions of cant transport, and band saw 28 is mounted for vertical reciprocation upon a pair of vertical rods 46, 48 that are secured to a supporting mounting frame 50 that straddles conveyor belt 30. Band saw 28 is vertically reciprocated upon rods 46, 48 by vertical reciprocation means 52, preferably a well-known hydraulic cylinder and piston 54 that is extended and retracted as valve 56 causes hydraulic fluid to flow from and to a source of hydraulic fluid pressure 58, in a manner well-known to those skilled in the art. It will be understood that the reference numeral 28' is used in the drawing figures to show, in dotted outline, a moved vertical position of band saw 28.

Band saw 28 has a well-known continuous-loop band saw blade 60 having teeth 62 and having a substantially horizontal blade portion 64 for cutting a board 66 from a top portion 70 of cant 26 as cant 26 reciprocates past horizontal blade portion 64, and blade 60 of band saw 28 is caused to move in a well-known manner by motor 72. One board 66 is cut from the top of cant 26 during each forward-direction pass of the cant 26, and the cant then moves in the reverse direction, the band saw 28 is lowered for the next pass of the cant so as to cut the desired thickness of the next board in the succession of boards cut from the cant, and the cant is caused to make multiple passes through the saw 28 until the succession of boards has been cut therefrom.

Figure 2:
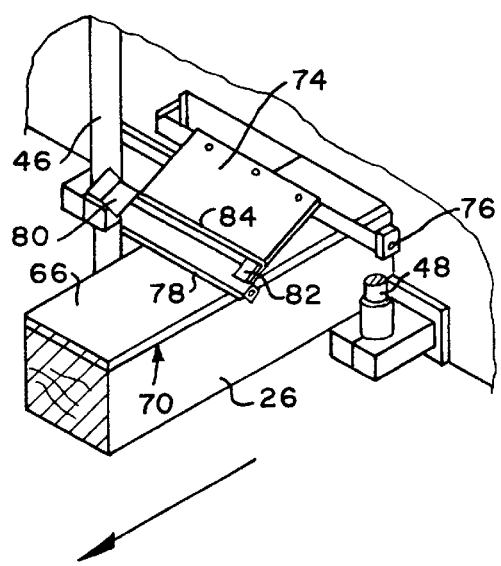
FIG. 2 is a partial perspective view of the raker gate of the present invention as a cant passes thereunder in the forward direction.
Figure 3:
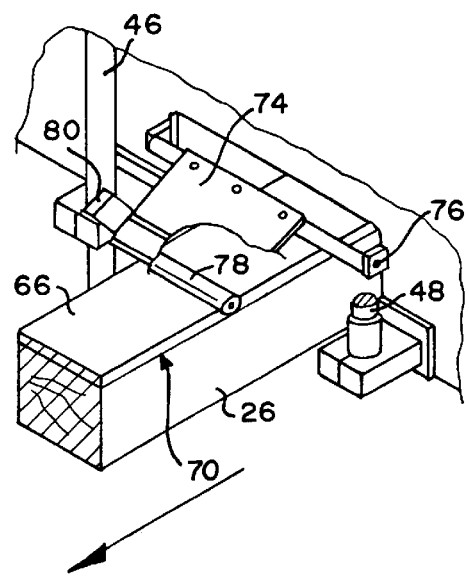
FIG. 3 is a partial perspective view of the raker gate of the present invention, similar to FIG. 2, but with a portion of the raker gate removed to show hidden detail.
Figure 4:
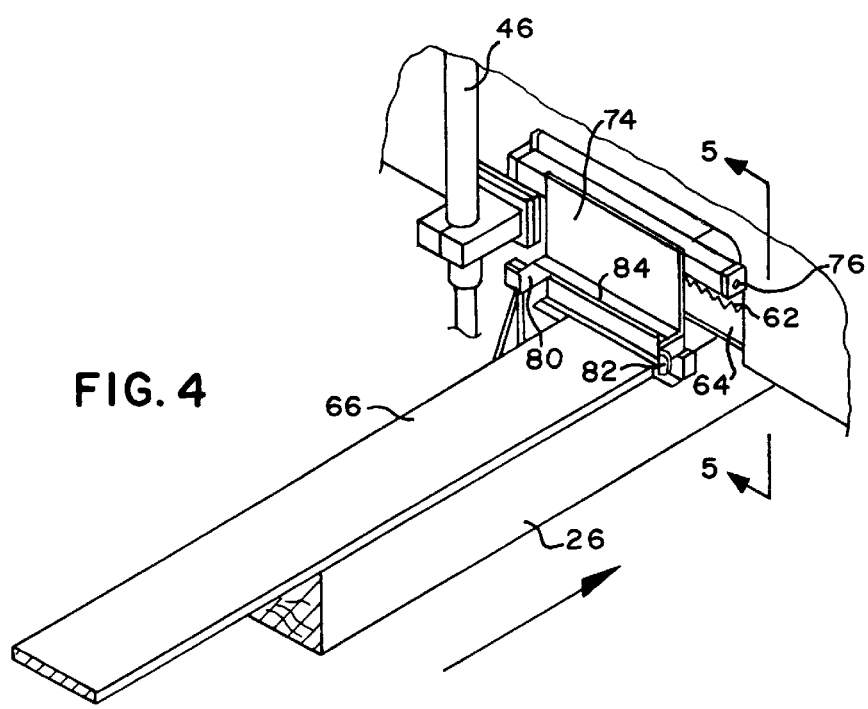
FIG. 4 is a perspective view of the raker gate of the present invention after sawing a board from the cant and with the cant reciprocating therepast in the reverse direction.

Resaw apparatus 20 further includes raker gate means 74 for engaging cut board 66 and for preventing cut board 66 from movement in the reverse direction past raker gate means 74, which is mounted downstream of band saw 28. Preferably, raker gate means 74 is hingeably mounted upon a substantially horizontal axis 76 to the downstream face of band saw 28. Raker gate means 74 has a first position, as shown in FIGS. 2 and 3, and shown in dotted outline in FIG. 10 as reference numeral 74', that permits cant 26 to move in the forward direction past raker gate means 74 while the board 66 is being cut from the cant 26. Raker gate means 74 also has a second and substantially vertical position, as shown in FIGS. 4 and 5, and in solid outline in FIG. 10, in which raker gate means 74 prevents cut board 66 from movement in the reverse direction past raker gate means 74.

Preferably, raker gate means 74 includes a roller 78 mounted for rotation along the lower edge of raker gate means 74 and extending therebelow so as to rollingly contact board 66 as board passes raker gate means 74 in the forward direction, as shown in FIGS. 2 and 3. Roller 78 on raker gate means 74 permits the operator to back up the cant 26 in the reverse direction while the saw blade 64 is still processing a cut (i.e., before the board 66 has been fully cut from the cant 26) if such a reverse movement of the cant becomes necessary. Raker gate means 74 preferably also has lateral flanges 80, 82 and a flange 84 atop and between flanges 80, 82 so as to ensure positive engagement of raker gate means 74 with the upstream end of cut board 66 when raker gate means 74 is in its second and substantially vertical position, thereby ensuring that raker gate means 74 prevents cut board 66 from moving therepast in the reverse direction.

Resaw apparatus 20 further includes optical measurement means 86 for measuring the height of top portion 70 of cant 26 above conveyor means 24. Preferably, optical measurement means 86 is a well-known laser triangulation measuring device such as a laser displacement transducer sold under the trademark DYNAVISION by LMI Technologies Inc., Vancouver, British Columbia, Canada. Other measurement means are available, but a laser triangulation measuring device is very accurate and is substantially unaffected by temperature changes. Optical measurement means 86 measures the height of the top of the cant prior to cutting the first board from the cant, and whenever a new cant axis is facing upward, as is the case when the cant is turned to a new face. Once the height of the top of the cant has been measured, the height of the saw blade can be appropriately adjusted so that the first board cut from the cant is of the desired thickness, and successive cuts will produce successive boards of desired thickness simply by moving the saw downward for each cut by a distance that corresponds to the successive desired board thicknesses.

Resaw apparatus 20 further includes live hold-down roller means 88, upstream of band saw 28 and preferably mounted to the upstream face of band saw 28, for pressing cant 26 onto conveyor means 24 while cant 26 moves in the forward direction. Hold-down roller means 88 is mounted on a vertical slide 90, in contrast to prior art hold-down rollers that are mounted on a pivoting arm. The structure of vertically-movable hold-down roller means 88 causes the hold-down pressure point to be in the same place relative to the saw blade, regardless of the height of the cant. With prior art hold-down rollers mounted on a pivoting arm, the pressure point on the cant changes in relation to the saw blade, becoming more or less distant from the saw blade, as the cant size changes because, with a pivoting arm, the hold-down roller moves in an arc as the height of the cant changes. Hold-down roller means 88 has a frictional outer engaging surface 92 that frictionally engages the top of cant 26, and roller means 88 is driven under power to turn in the same forward direction, and at the same rate, as the movement of cant 26 thereunder.

Figure 10:
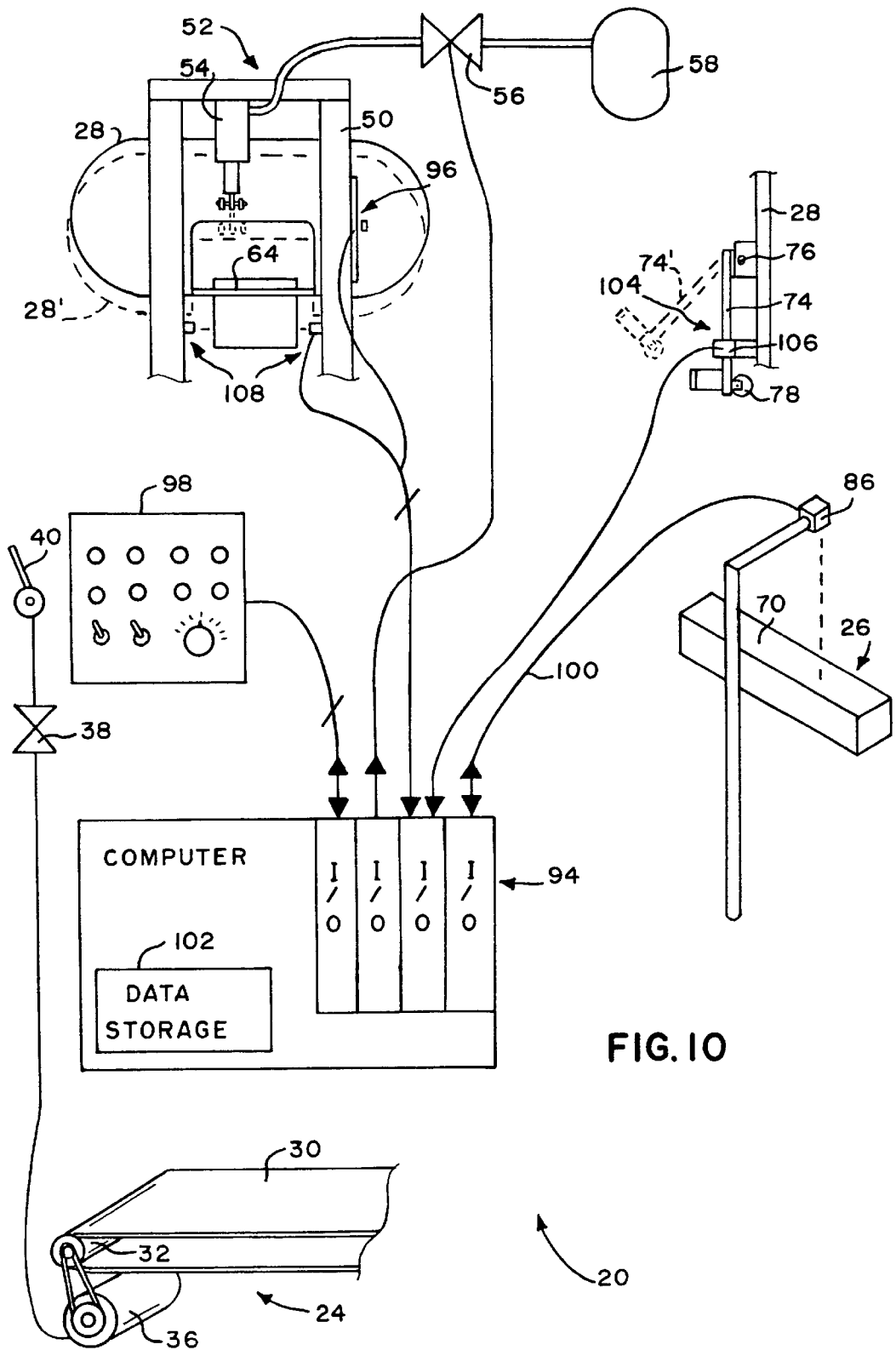
FIG. 10 is a schematic block diagram showing interconnection and control of various parts of the present invention.

Referring especially to FIG. 10, resaw apparatus 20 is provided with a control means 94 for controlling the various aspects of the operation of resaw apparatus 20. Control means 94 could be a well-known programmable logic controller ("PLC"), but is preferably a computer such as a PC-104 bus single board computer running appropriate control software. A well-known magnetostrictive linear displacement transducer 96 is interfaced to control means 94 to permit control means 94 to monitor the vertical position of horizontal saw blade portion 64. Alternatively, a well-known optical encoder could be used to measure the vertical position of the saw, and monitoring of the vertical position of a saw is well-known to those skilled in the art. Control means 94 also includes an interface card to control the operation of hydraulic valve 56 and thereby causes hydraulic cylinder and piston 54 of vertical reciprocation means 52 to move band saw 28 vertically under software control, and the position of the saw is precisely monitored by control means 94 via transducer 96.

Control means 94 is also interfaced to an operator's console 98 having a variety of buttons, switches, and lights so that the operator can direct and monitor the operation of resaw apparatus 20.

Control means 94 communicates with optical measurement means 86 as over a well-known RS-485 serial interface 100, and can send a measurement command, as an ASCII code sequence, to measurement means 86 in response to the pressing of a button on console 98 by the operator. In response, measurement means 86 reports, by an ASCII code sequence, the measured distance to the top of the cant from the measurement means 86, in thousandths of an inch, from which the height of the top of the cant may be calculated, after an appropriate calibration sequence. Alternate embodiments for measurement means 86 could equivalently output an analog signal proportional to the distance measured.

Control means 94 also preferably includes well-known data storage memory 102, and this memory may hold different preset board and cant sawing configurations for recall by the computer software under direction of the operator of the resaw apparatus, and storage of preset board and cant sawing configurations is well-known in the prior art.

Resaw apparatus 20 further preferably includes raker gate position sensing means 104, such as a proximity switch 106, interfaced to control means 94, for sensing when raker gate means 74 is in its second and substantially vertical position. As hereinafter described, when control means 94 becomes aware that raker gate means 74 is in the second and substantially vertical position, control means 94 causes vertical reciprocation means 52 to raise blade portion 64 to be vertically spaced slightly above and from cant 26 when cant is moving in the reverse direction so that the saw blade will clear any splinters that might be sticking up from cant 26.

Additionally, resaw apparatus 20 further preferably includes photoelectric sensors 108 that are interfaced to control means 94, with sensors 108 being located proximate to saw blade portion 64 such that the beam of sensors 108 becomes broken by the passage of cant 26 therethrough, thereby permitting the detection of cant passing through the saw.

Now that the structure of the resaw apparatus 20 has been described, the operation of the apparatus can be explained. A succession of cants is loaded onto the infeed table. An operator in a control booth turns the next cant 26 to be cut of the succession of cants using a well-known hydraulic log turner (not shown) to determine which face of the cant 26 should be cut first, and the chosen face for cutting is left positioned facing upward. The operator then presses a button on operator's console 98 that causes optical measurement means 86 to measure the height of the top of the cant 26 above the infeed table 44, and the operator then presses a second button on operator's console 98 that causes control means 94 to adjust the vertical position of band saw 28 to cut the desired and chosen thickness first board from the top of the cant 26.

The operator then operates lever 40 to cause the conveyor belt 30 and powered infeed rollers 42 of conveyor means 34 to feed cant 26 toward and through band saw 28, with live hold-down roller means 88 being caused to move downwardly and contact cant 26 and thereby press cant 26 onto and against conveyor belt 30, and the live roller of hold down roller means 88 is driven and rotates while pressing the top face of the cant 26 so as to aid in the movement of cant 26 through the band saw 28. The operator may vary the forward feed speed of the cant 26 through and past the band saw 28 by appropriate operation of lever 40.

As cant 26 passes through the band saw 28 in the forward feed direction and contacts raker gate means 74, raker gate means 74 is urged into its first position shown in FIGS. 2 and 3, and in dotted outline in FIG. 10, so as to permit cant 26 to move therepast. When cant 26 passes completely past raker gate means 74 in the forward direction, raker gate means 74 then drops into its second and substantially vertical position as shown in FIGS. 4 and 5, and in solid outline in FIG. 10, so as to engage cut board 66 and thereby prevent cut board 66 from movement in the reverse direction past raker gate means 74 as cant 26 moves in the reverse direction in preparation for another cutting cycle. When raker gate means 74 drops into its second and substantially vertical position, raker gate position sensing means 104 senses that raker gate means 74 has entered its second and substantially vertical position, and control means 94 then operates vertical reciprocation means 52 to raise band saw 28, and thus also to raise horizontal blade portion 64 of band saw 28, so that horizontal blade portion 64 of band saw 28 becomes vertically spaced from cant 26 so that the horizontal blade portion 64 of band saw 28 will be raised above any splinters that may be sticking up from cant 26 during the upcoming reverse feed pass of the cant 26, for safety reasons so that splinters are not hurled from the cant 26 by the band saw's blade and so that the saw blade does not catch on the cant during the reverse direction movement of the cant.

After the cant 26 has passed completely through and past band saw 28 and board 66 has been cut from the top portion of the cant 26, the operator reverses the feed direction of the conveyor means 24 by operation of lever 40 so that the cant is caused to move in the reverse direction. Because cut board 66 is engaged by raker gate means 74 and prevented from passing in the reverse direction past raker gate means 74, the cant 26 moves relative to and passes under the cut board 66 as cant 26 moves in the reverse direction, as shown in FIG. 4, and, after cant 26 passes raker gate means 74 in the reverse direction, cut board 66 falls to the conveyor belt 30.

The operator then initiates another forward direction pass of the cant, with control means 94 setting the vertical height of band saw 28 as the next and following boards are cut from cant 26. As appropriate, the operator may turn the cant about its longitudinal axis to expose another face as the topmost face of the cant so as to maximize the grade of the cut boards. The forward and reverse reciprocation of the cant continues as successive boards are cut from the cant. During each forward pass of the cant through the band saw, the most recently and previously-cut board will ride in front of the cant on the conveyor belt 30 along outfeed table 22, and successively-cut boards will progress to the end of the outfeed table 22.

Although the present invention has been described and illustrated with respect to a preferred embodiment and a preferred use therefor, it is not to be so limited since modifications and changes can be made therein which are within the full intended scope of the invention.

I claim:

1. A resaw apparatus for sawing a succession of boards from a cant of a succession of cants, said resaw apparatus comprising:
   (a) conveyor means for reciprocatingly transporting said cant of said succession of cants thereupon in a forward direction and in a reverse direction;
   (b) a band saw mounted substantially transverse to said directions of transport and mounted for vertical reciprocation with respect to said conveyor means, said band saw having a substantially horizontal blade portion for cutting a board of said succession of boards from a top portion of said cant;
   (c) vertical reciprocation means for causing said band saw to move vertically with respect to said conveyor means; and
   (d) raker gate means for engaging said cut board and for preventing said cut board from movement in said reverse direction past said raker gate means; said raker gate means being mounted downstream of said band saw.

2. The resaw apparatus as recited in claim 1, in which said resaw apparatus further comprises optical measurement means for measuring the height of said top portion of said cant above said conveyor means.

3. The resaw apparatus as recited in claim 1, in which said raker gate means is hingeably mounted upon a substantially horizontal axis to said band saw; said raker gate means having a first position that permits said cant to move in said forward direction therepast while said board of said succession of boards is being cut from said cant, and said raker gate means having a second and substantially vertical position that prevents said cut board from movement in said reverse direction past said raker gate means.

4. The resaw apparatus as recited in claim 3, in which said resaw apparatus further comprises:
   (a) control means for controlling said vertical reciprocation means;
   (b) raker gate position sensing means, operably connected to said control means, for sensing when said raker gate is in said second position;
such that said control means causes said vertical reciprocation means to raise said substantially horizontal blade portion of said band saw to be vertically spaced from said cant when said raker gate position sensing means senses that said raker gate is in said second position.

5. The resaw apparatus as recited in claim 1, in which said resaw apparatus further comprises hold-down roller means, upstream of said band saw, for pressing said cant onto said conveyor means while said cant moves in said forward direction.

6. A resaw apparatus for removing a succession of boards from a cant of a succession of cants, said resaw apparatus comprising:
   (a) conveyor means for reciprocatingly transporting said cant of said succession of cants thereupon in a forward direction and in a reverse direction;
   (b) a band saw mounted substantially transverse to said directions of transport and mounted for vertical reciprocation with respect to said conveyor means, said band saw having a substantially horizontal blade portion for cutting a board of said succession of boards from a top portion of said cant;
   (c) optical measurement means for measuring the height of said top portion of said cant above said conveyor means;
   (d) vertical reciprocation means for causing said band saw to move vertically with respect to said conveyor means;
   (e) control means for controlling said vertical reciprocation means;

(f) raker gate means for engaging said cut board and for preventing said cut board from movement in said reverse direction past said raker gate means; said raker gate means being hingeably mounted upon a substantially horizontal axis to said band saw and downstream thereof; said raker gate means having a first position that permits said cant to move in said forward direction therepast while said board of said succession of boards is being cut from said cant, and said raker gate means having a second and substantially vertical position that prevents said cut board from movement in said reverse direction past said raker gate means; and, (g) raker gate position sensing means, operably connected to said control means, for sensing when said raker gate is in said second position; such that said control means causes said vertical reciprocation means to raise said substantially horizontal blade portion of said band saw to be vertically spaced from said cant when said raker gate position sensing means senses that said raker gate is in said second position.

7. The resaw apparatus as recited in claim 6, in which said resaw apparatus further comprises hold-down roller means, upstream of said band saw, for pressing said cant onto said conveyor means while said cant moves in said forward direction.

* * * * *